US011192546B2

United States Patent
Yamada et al.

(10) Patent No.: US 11,192,546 B2
(45) Date of Patent: Dec. 7, 2021

(54) VEHICLE CONTROL APPARATUS

(71) Applicant: TOYOTA JIDOSHA KABUSHIKI KAISHA, Toyota (JP)

(72) Inventors: Hiroshi Yamada, Nisshin (JP); Takuro Yamada, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 343 days.

(21) Appl. No.: 16/512,670

(22) Filed: Jul. 16, 2019

(65) Prior Publication Data
US 2020/0031345 A1 Jan. 30, 2020

(30) Foreign Application Priority Data
Jul. 30, 2018 (JP) .............................. JP2018-142237

(51) Int. Cl.
| | |
|---|---|
| *B60T 8/32* | (2006.01) |
| *B60W 30/14* | (2006.01) |
| *B60W 10/06* | (2006.01) |
| *B60W 10/18* | (2012.01) |
| *B60W 10/10* | (2012.01) |

(52) U.S. Cl.
CPC .......... *B60W 30/143* (2013.01); *B60W 10/06* (2013.01); *B60W 10/10* (2013.01); *B60W 10/18* (2013.01); *B60W 2510/18* (2013.01); *B60W 2520/10* (2013.01); *B60W 2710/0677* (2013.01); *B60W 2710/1005* (2013.01); *B60W 2710/18* (2013.01)

(58) Field of Classification Search
CPC .... B60W 30/143; B60W 10/06; B60W 10/10; B60W 10/18; B60W 2520/10; B60W 2710/0677; B60W 2710/1005; B60W 2710/18
See application file for complete search history.

(56) References Cited

U.S. PATENT DOCUMENTS

| | | |
|---|---|---|
| 2002/0006850 A1 | 1/2002 | Takao et al. |
| 2006/0025918 A1 | 2/2006 | Saeki |
| 2017/0072926 A1 | 3/2017 | Fukuda et al. |
| 2018/0072307 A1* | 3/2018 | Oguma ........... B60W 30/18127 |
| 2019/0118820 A1* | 4/2019 | Akita .............. B60W 30/18072 |

FOREIGN PATENT DOCUMENTS

| | | |
|---|---|---|
| JP | 2002-029280 A | 1/2002 |
| JP | 2006-315491 A | 11/2006 |
| JP | 4172434 B2 | 10/2008 |
| JP | 4929777 B2 | 5/2012 |
| JP | 2014-148293 A | 8/2014 |
| JP | 2017-056827 A | 3/2017 |

* cited by examiner

*Primary Examiner* — Adam M Alharbi
(74) *Attorney, Agent, or Firm* — Sughrue Mion, PLLC

(57) ABSTRACT

Disclosed is a vehicle control apparatus applied to a vehicle including an automatic transmission. The vehicle control apparatus includes a friction brake apparatus for generating friction braking force acting on the vehicle, and a driving support ECU for performing cruise control. The driving support ECU causes the automatic transmission to perform downshift upon satisfaction of a downshift condition which is satisfied when a friction brake high load state continues for a predetermined determination threshold time.

3 Claims, 8 Drawing Sheets

SECOND MODIFICATION OF FIRST
EMBODIMENT APPARATUS

FROM STEP 325 OF FIG. 3

330a
DETERMINE DETERMINATION
THRESHOLD TIME tsth
tsth ← Tth (CONSTANT VALUE)

TO STEP 335 OF FIG. 3

FIG.6

FIRST MODIFICATION OF SECOND
EMBODIMENT APPARATUS

FROM STEP 325 OF FIG. 7

710a

DETERMINE DETERMINATION THRESHOLD TIME tsth

WHEN DOWNSHIFT EXECUTION FLAG Xs = 0

| GEAR STAGE Sgear | 2nd | 3rd | 4th | 5th | 6th | Ms0 |
|---|---|---|---|---|---|---|
| tsth | T0th2 | T0th3 | T0th4 | T0th5 | T0th6 | |

WHEN DOWNSHIFT EXECUTION FLAG Xs = 1

| GEAR STAGE Sgear | 2nd | 3rd | 4th | 5th | 6th | Ms1 |
|---|---|---|---|---|---|---|
| tsth | T1th2 | T1th3 | T1th4 | T1th5 | T1th6 | |

TO STEP 335 OF FIG. 7

FIG.8

VEHICLE CONTROL APPARATUS

BACKGROUND OF THE INVENTION

1. Field of the Invention

The present invention relates to a vehicle control apparatus for causing a vehicle to travel such that the vehicle speed (the speed of the vehicle) coincides with a predetermined target vehicle speed.

2. Description of the Related Art

A vehicle control apparatus which executes constant-speed-travel control, which is one type of cruise control, has conventionally been known. The constant-speed-travel control causes an own vehicle to travel at a "target vehicle speed set by a driver."

Such a vehicle control apparatus (hereinafter referred to as the "conventional apparatus") computes a target acceleration for rendering the vehicle speed coincident with the target vehicle speed. The conventional apparatus renders the acceleration of the own vehicle coincident with the target acceleration by controlling an internal combustion engine, an automatic transmission, and a friction brake apparatus (see Japanese Patent Application Laid-Open (kohl) No. 2017-56827).

More specifically, in the case where deceleration sufficient for achieving a negative target acceleration (namely, a target deceleration) cannot be obtained through control of the output of the internal combustion engine, the conventional apparatus causes the friction brake apparatus to generate a friction braking force.

Furthermore, in order to prevent "busy shift" which is a phenomenon in which the gear stage (gear position) of an automatic transmission changes frequently, the conventional apparatus performs downshift (gear change for changing the gear stage to a gear stage having a larger gear ratio) only when the vehicle speed has increased by a predetermined amount within a predetermined period of time.

Incidentally, in the case where the own vehicle travels on a downhill road in a state in which the constant-speed-travel control is being executed, the vehicle speed tends to become higher than the target vehicle speed. Accordingly, in such a situation, the conventional apparatus causes the friction brake apparatus to generate a "relatively large friction braking force." Namely, a state in which high load acts on the friction brake apparatus (hereinafter a "friction brake high load state") occurs.

In such a case, there arises a situation in which the speed of the own vehicle does not increase by the predetermined amount within the predetermined period of time due to the friction braking force, and consequently, downshift is not performed. In the case where downshift is not performed, the force for decelerating the own vehicle; specifically, braking force produced by a drive source (for example, so called "engine braking force"), does not increase, and therefore, the friction brake high load state continues. Accordingly, in the case where the downhill road is long, the friction brake high load state continues for a long period of time, which may result in occurrence of a phenomenon in which the temperatures of brake pads and/or a disc rotor of each wheel increase and brake performance deteriorates (namely, fade phenomenon (hereinafter simply referred to as "fade")).

In the case where the fade has deteriorated the brake performance, a deceleration to be generated cannot be generated by using friction braking force during the constant-speed-travel control. Therefore, the driver may feel an unnatural sensation. Also, in the case where the constant-speed-travel control is stopped and the driver his/herself performs a braking operation, the driver may feel that the brake performance is poor.

SUMMARY OF THE INVENTION

The present invention has been accomplished so as to solve the above-described problem. Namely, an object of the present invention is to provide a vehicle control apparatus (hereinafter also referred to as the "apparatus of the present invention") which can prevent deterioration of brake performance due to fade while avoiding deterioration of drivability, which would otherwise occur due to frequent downshift, during performance of constant-speed-travel control.

The apparatus of the present invention is a vehicle control apparatus (10, 20, 30) for a vehicle including a power engine (22), an automatic transmission (24) for transmitting power generated by the power engine to drive wheels of the vehicle, and a friction brake apparatus (32) for generating friction braking force applied to the vehicle, the vehicle control apparatus performing constant-speed-travel control for causing the vehicle to travel such that vehicle speed which is the speed of the vehicle coincides with a predetermined target vehicle speed.

Said vehicle control apparatus comprises:
- a power reducing section (10, 20, step 220, step 245) which controls the power engine so as to reduce the power, without causing the automatic transmission to change its gear ratio (step 320, step 325), in the case where the vehicle speed must be decreased to coincide with the target vehicle speed; and
- a friction braking force increasing section (10, 30, step 250, step 260) which controls the friction brake apparatus so as to increase the friction braking force, without causing the automatic transmission to change the gear ratio (step 320 and step 325), in the case where the vehicle speed must be decreased to coincide with the target vehicle speed even after the power has been reduced by the power reducing section.

The apparatus of the present invention increases drive source braking force by reducing the power generated by the power engine, without causing the automatic transmission to perform downshift, when the vehicle speed must be decreased to coincide with the target vehicle speed, for example, in the case where the vehicle is travelling on a downhill road. Further, the apparatus of the present invention increases the friction braking force generated by the friction brake apparatus, without causing the automatic transmission to perform downshift, when the vehicle speed must be decreased. Accordingly, busy shift is unlikely to occur.

Meanwhile, in this case, for example, when the downhill road is long, the friction brake high load state continues for a long period of time, and as a result, the temperatures of the members of the friction brake apparatus increase, and possibly, fade occurs, whereby brake performance deteriorates.

In view of the above, the apparatus of the present invention comprises a downshift performing section (10, 20, step 350) which causes the automatic transmission to perform downshift upon satisfaction of a downshift condition which is satisfied when a friction brake high load state which is a state in which the friction braking force is larger than a predetermined threshold continues for a predetermined determination threshold time (step 335, step 345), the downshift changing the gear ratio of the automatic transmission to a gear ratio larger than a gear ratio at a point in time when the downshift condition is satisfied.

As a result, when the friction brake high load state continues for the predetermined determination threshold time, downshift is performed, whereby the drive source braking force increases. As a result, the friction braking force generated by the friction brake apparatus can be decreased, whereby the temperature increases of the members of the friction brake apparatus can be suppressed. Thus, the possibility of occurrence of fade can be reduced.

In one mode of the apparatus of the present invention, the downshift performing section is configured to set the determination threshold time such that the smaller the gear ratio of the automatic transmission during a period during which the friction brake high load state continues, the shorter the determination threshold time (step 330).

For example, in the case where the gear stage is a "high-speed-side gear stage which is small in gear ratio," since the drive source braking force is small, there arises a situation where the friction brake apparatus must generate a larger friction braking force. In such a case, the possibility that the temperatures of the members of the friction brake apparatus increase within a short period of time and fade occurs increases. In contrast, in this mode, the time between the point in time when the friction brake high load state has occurred and the point in time when downshift is performed (namely, the determination threshold time) becomes shorter when the gear stage of the automatic transmission is a high-speed-side gear stage, as compared with, for example, the case where the gear stage of the automatic transmission is a "low-speed-side gear stage which is large in gear ratio." Therefore, the possibility of occurrence of fade due to increases in the temperatures of the members of the friction brake apparatus can be decreased quickly.

Meanwhile, in the case where downshift is performed when the gear stage is a lower-speed-side gear stage, a shock is likely to be generated due to a large change in the drive source braking force, whereby drivability may deteriorate. In contrast, in this mode, the time between the point in time when the friction brake high load state has occurred and the point in time when downshift is performed (namely, the determination threshold time) becomes longer when the gear stage of the automatic transmission is a low-speed-side gear stage, as compared with the case where the gear stage of the automatic transmission is a high-speed-side gear stage. Therefore, in the case where the gear stage of the automatic transmission is a lower-speed-side gear stage, downshift is less likely to occur, whereby the frequency at which deterioration in drivability occurs can be reduced.

In another mode of the invention of the present invention, the downshift performing section is configured to set the determination threshold time to a first time in the case where the downshift has never been performed in the period during which the friction brake high load state continues, and set the determination threshold time to a second time shorter than the first time after the downshift has been performed (step 710, step 730, step 740, step 810).

In this mode, the determination threshold time is set to the first time, which is relatively long, until a first downshift is performed in the period during which the friction brake high load state continues. Therefore, when the downhill road is relatively short, downshift becomes less likely to be performed. Accordingly, the frequency at which deterioration in drivability occurs can be reduced.

Meanwhile, in the case where the friction brake high load state continues after the first downshift has been performed in the period during which the friction brake high load state has continued, the determination threshold time is set to the second time, which is relatively short. Accordingly, in the case where the friction brake high load state continues even after the first downshift, for example, because the downhill road is long, second and subsequent downshifts are performed quickly. As a result, it is possible to reduce the possibility that the temperatures of the members of the friction brake apparatus increase and fade occurs.

In the above description, in order to facilitate understanding of the present invention, the constituent elements of the invention corresponding to those of embodiments of the invention which will be described later are accompanied by parenthesized names and/or symbols which are used in the embodiments; however, the constituent elements of the invention are not limited to those in the embodiments defined by the names and/or the symbols.

BRIEF DESCRIPTION OF THE DRAWINGS

FIG. 6 is a flowchart representing a routine executed by a CPU of a driving support ECU of a vehicle control apparatus according to a second modification of the first embodiment;

FIG. 8 is a flowchart representing a routine executed by a CPU of a driving support ECU of a vehicle control apparatus according to a first modification of the second embodiment.

DESCRIPTION OF THE PREFERRED EMBODIMENTS

Figure 1:
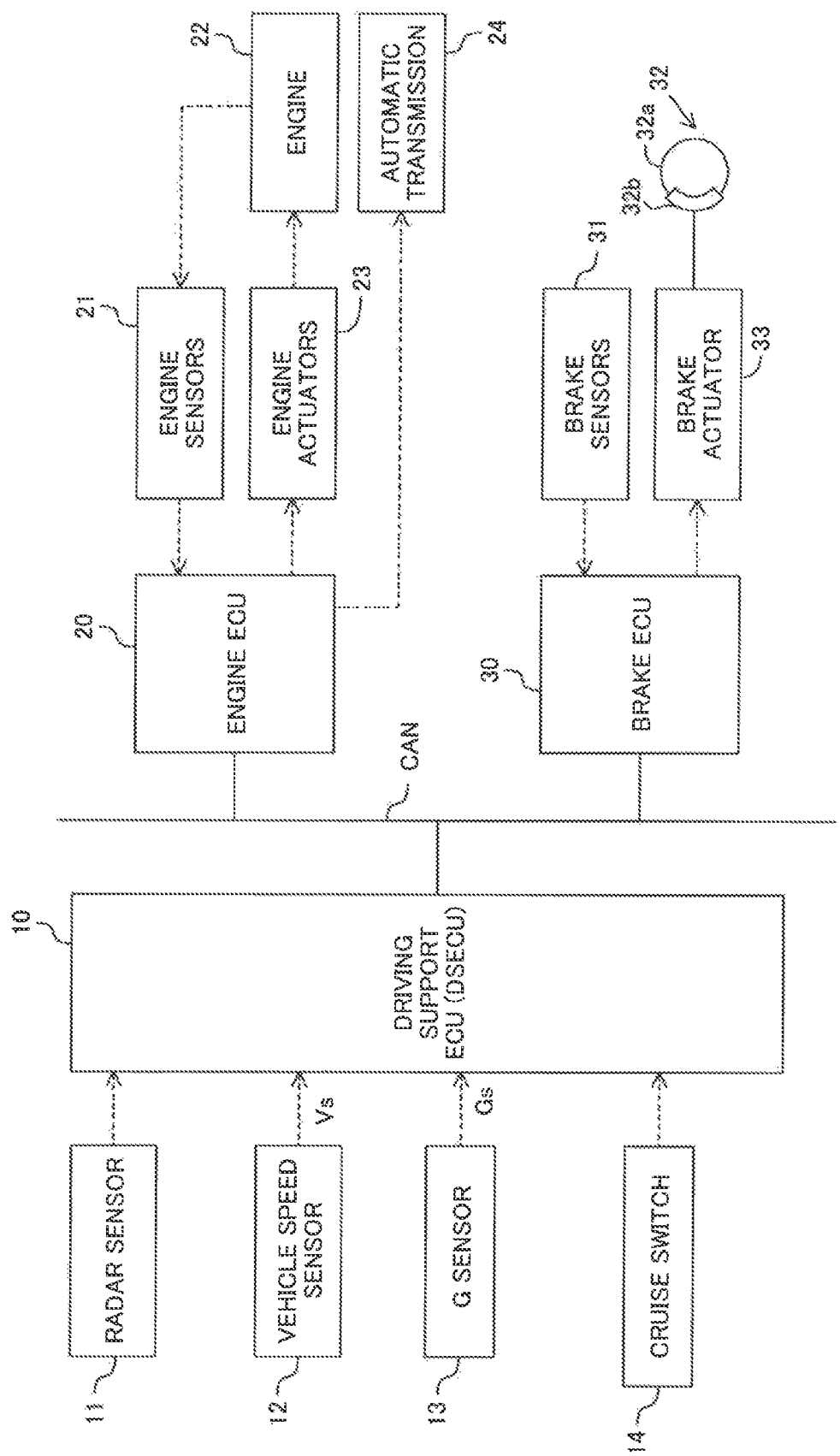
FIG. 1 is a schematic diagram of a vehicle control apparatus according to a first embodiment.

Vehicle control apparatuses according to embodiments of the present invention will now be described. Notably, throughout the drawings of the embodiments, the same or corresponding portions are denoted by the same reference numerals.

First Embodiment

<<Configuration>>

A vehicle control apparatus according to a first embodiment of the present invention (hereinafter also referred to as the "first embodiment apparatus") is applied to an unillustrated vehicle (for example, an automobile). In some cases, the vehicle to which the first embodiment apparatus is applied will be referred to as the "own vehicle" in order to distinguish the vehicle from other vehicles. As shown in FIG. 1, the first embodiment apparatus includes a driving support ECU 10, an engine ECU 20, and a brake ECU 30." In the present specification, ECU stands for an electric control unit.

These ECUs are connected to one another through a CAN (controller area network) in such a manner that they can exchange data (can communicate) with one another. Each ECU includes a microcomputer. The microcomputer includes a CPU, a ROM, a RAM, an interface (I/F), etc. The CPU realizes various functions by executing instructions (programs, routines) stored in the ROM. In the following description, the driving support ECU 10 will be referred to as the "DSECU" for simplification.

The DSECU is connected to the following sensors (including switches) provided in the own vehicle and receives detection signals or output signals of the sensors. Notably, each sensor may be connected to an ECU other than the DSECU. In such a case, the DSECU receives the detection signal or output signal of each sensor, through the CAN, from the ECU to which the sensor is connected.

A radar sensor 11 is a known sensor using a radio wave in the millimeter wave band (hereinafter referred to as the "millimeter wave"). The radar sensor 11 obtains target information which specifies the distance between the own vehicle and a three-dimensional object, the relative speed of the three-dimensional object in relation to the own vehicle, the relative position (direction) of the three-dimensional object in relation to the own vehicle, etc., and outputs the target information to the DSECU.

A vehicle speed sensor 12 detects the travel speed Vs of the own vehicle (vehicle speed) and outputs a signal representing the detected vehicle speed Vs.

An acceleration (G) sensor 13 detects the acceleration Gs of the own vehicle and outputs a signal representing the detected acceleration Gs. When the acceleration Gs is a negative value, the magnitude (absolute value) of the acceleration Gs represents deceleration.

A cruise switch 14 is an input device operated by the driver. Signals and information which will be described below are input through use of the cruise switch 14.

Request signal for starting the constant-speed-travel control (start request signal)

Request signal for stopping the constant-speed-travel control (stop request signal)

Target vehicle speed Vset used in the constant-speed-travel control

Notably, the constant-speed-travel control is one type of cruise control (CC) and automatically causes the own vehicle to travel at the target vehicle speed Vset. The cruise switch 14 is also operated for setting a target inter-vehicle time (which will be described later) to a desired time.

In the case where the constant-speed-travel control is not performed, when the driver operates the cruise switch 14 in a specific manner, the start request signal is sent to the DSECU. In the case where the constant-speed-travel control is being performed, when the driver operates the cruise switch 14 in a specific manner, the stop request signal is sent to the DSECU.

The engine ECU 20 is connected to a plurality of engine sensors 21 and receives detection signals or output signals of these sensors. The engine sensors 21 detect the operation state quantities, operation manipulated variables, etc. of an internal combustion engine 22 (power engine) which is a drive source of the own vehicle. The engine sensors 21 include an accelerator pedal operation amount sensor, a quote valve opening sensor, an engine speed sensor, an intake air amount sensor, etc. Furthermore, the engine ECU 20 obtains the current gear stage Sgear of an automatic transmission 24.

The engine ECU 20 is connected to engine actuators 23 and the automatic transmission 24. The engine actuators 23 change the operation state of the internal combustion engine 22, thereby changing the power generated by the internal combustion engine 22. In the present embodiment, the internal combustion engine 22 is a gasoline-injection, spark-ignition-type multi-cylinder engine and includes a throttle valve for adjusting the amount of intake air. The engine actuators 23 include at least a throttle valve actuator which changes the opening of the throttle valve (hereinafter referred to as the "throttle opening"), The automatic transmission 24 is a known multi-speed automatic transmission. The automatic transmission 24 selects one of a plurality of gears (gear stages) by using the pressure of hydraulic oil flowing through a hydraulic circuit.

The gear stages of the automatic transmission 24 include gear stages for forward movement and a gear stage for backward movement. The gear stages for forward movement include "1st gear, 2nd gear, 3rd gear, 4th gear, 5th gear, and 6th gear" which differ in gear ratio from one another. An Nth gear (N is an integer) is also referred to as the "Nth gear stage."

As is well known, the gear ratio decreases in the order of the 1st gear, the 2nd gear, the 3rd gear, the 4th gear, the 5th gear, and the 6th gear. The smaller the gear ratio (higher the gear stage), the smaller the drive source braking force (engine braking force (deceleration force acting on the own vehicle)) produced by the rotation resistance of the internal combustion engine 22. The gear stage for backward movement is the reverse gear. The 1st gear, the 2nd gear, and the 3rd gear can be said to be gear stages on the low speed side (low gear stages). The 4th gear, the 5th gear, and the 6th gear can be said to be gear stages on the high speed side (high gear stages).

The engine ECU 20 can change the torque (power) generated by the internal combustion engine 22 by driving the engine actuators 23. The engine ECU 20 can control the gear stage (gear ratio) of the automatic transmission 24 on the basis of "upshift lines and downshift lines" previously set for the vehicle speed Vs and the throttle valve opening.

Namely, in the case where the gear stage is the Nth gear stage, when the operation point determined by vehicle speed Vs and the throttle valve opening crosses an upshift line corresponding to the Nth gear stage, the engine ECU 20 changes the gear stage to the (N+1)th gear stage. Namely, the engine ECU 20 upshifts the gear stage to a higher gear stage adjacent to the current gear stage. In the case where the gear stage is the Nth gear stage, when the operation point determined by the vehicle speed Vs and the throttle valve opening crosses a downshift line corresponding to the Nth gear stage, the engine ECU 20 changes the gear stage to the (N−1)th gear stage. Namely, the engine ECU 20 downshifts the gear stage to a lower gear stage adjacent to the current gear stage. In the present specification, such gear stage control will be referred to as the "normal gear shift control."

The torque (power) generated by the internal combustion engine 22 is transmitted to drive wheels (not shown) through the automatic transmission 24. Accordingly, the engine ECU 20 can control the drive force of the own vehicle by changing the power of the internal combustion engine 22 by using the engine actuators 23 and controlling the gear stage of the automatic transmission 24. Namely, the engine ECU 20 can change the acceleration Gs (including negative acceleration Gs; i.e., deceleration) of the own vehicle.

The brake ECU 30 is connected to a plurality of brake sensors 31 and receives detection signals or output signals of these sensors. The brake sensors 31 detect parameters used for controlling friction brake apparatuses (also referred to as "friction brake mechanisms") 32. The brake sensors 31 include a brake pedal operation amount sensor and wheel speed sensors for detecting the rotational speeds of the wheels, etc.

Each friction brake apparatus 32 includes a brake disc 32a fixed to each of the wheels, and a brake caliper 32b fixed to the vehicle body. The brake caliper 32b includes brake pads (not shown) which are pressed against the brake disc 32a.

The brake ECU 30 is connected to a brake actuator 33. The brake actuator 33 is provided in a hydraulic circuit extending between a master cylinder (not shown) and the friction brake apparatuses 32 provided for the front and rear, left and right wheels. The brake actuator 33 is a known actuator which individually adjusts the hydraulic oil pressures supplied to respective wheel cylinders (not shown) built in the brake calipers 32b for the plurality of wheels. When the corresponding brake pads are pressed against the brake discs 32a of the wheels by operating the respective wheel cylinders through application of the hydraulic oil pressure thereto, friction braking forces (hydraulic braking forces) act on the wheels.

When the brake ECU 30 receives a signal representing a brake required braking force Bfreq from the DSECU, the brake ECU 30 computes a "target brake oil pressure of each wheel" on the basis of the brake required braking force Bfreq. Further, the brake ECU 30 controls the brake actuator 33 such that the pressure of the hydraulic oil supplied to the wheel cylinder of each wheel coincides with the target brake oil pressure of each wheel. Accordingly, the brake ECU 30 can render the friction braking force applied to the own vehicle coincident with the brake required braking force Bfreq. For convenience' sake, the brake required braking force Bfreq and the target brake oil pressure will be referred to as a "brake instruction value."

Namely, the brake ECU 30 can control, by controlling the brake actuator 33, the friction braking force applied to the own vehicle by the friction brake apparatus 32. As a result, the brake ECU 30 can change the acceleration Gs (deceleration which is negative acceleration Ga) of the own vehicle.

<<Constant-Speed-Travel Control>>

In the case where the travel mode of the own vehicle is a normal travel mode, when the start request signal is sent to the DSECU as a result of the cruise switch 14 being operated by the driver, the DSECU changes the travel mode of the own vehicle to a constant-speed-travel control mode. When the travel mode is the constant-speed-travel control mode, the DSECU performs "constant-speed-travel control" for automatically causing the own vehicle to cruise such that the vehicle speed Vs becomes equal to the target vehicle speed Vset.

More specifically, when the DSECU performs the constant-speed-travel control, the DSECU obtains (computes) the vehicle speed Vs of the own vehicle on the basis of the signal from the vehicle speed sensor 12. The DSECU computes a target acceleration Ac* for rendering the vehicle speed Vs coincident with the target vehicle speed Vset by using the following Expression (1).

$$Ac^* = (Vset - Vs) \times K1(Vs) \qquad (1)$$

In Expression (1), K1(Vs) represents an acceleration gain for constant speed travel which is set to a positive value corresponding to the vehicle speed Vs. More specifically, the gain K1(Vs) is set such that its value decreases as the vehicle speed Vs increases.

In the case where the vehicle speed deviation (Vset−Vs) in the right side of Expression (1) is positive, a target acceleration Ac*(>0) for accelerating the own vehicle is computed. In the case where the vehicle speed deviation (Vset−Vs) is negative, a target acceleration Ac*(<0) for decelerating the own vehicle is computed.

The DSECU controls the drive force of the own vehicle such that the actual acceleration Gs of the own vehicle detected by the acceleration sensor 13 becomes equal to the target acceleration Ac* and also controls the friction braking force when necessary. These controls will be described in detail later. Notably, in the constant-speed-travel control, the DSECU may use, as the actual acceleration Gs, the amount of change of the vehicle speed Vs per unit time.

Notably, when the travel mode is the constant-speed-travel control mode, the DSECU performs "gear shift control for cruise" as described below. Specifically, in the case where the throttle value is not fully closed, the DSECU performs gear shift control similar to the "normal gear shift control."

Meanwhile, in the case where the throttle value is fully closed, the DSECU prohibits the "normal gear shift control" and determines whether or not a cruise downshift condition is satisfied on the basis of the vehicle speed Vs, the vehicle speed deviation (Vs−Vset), and the magnitude (absolute value) of the actual acceleration Gs of the own vehicle. When the cruise downshift condition is satisfied, the DSECU performs a downshift. For example, in the case where the magnitude of the actual acceleration Gs of the own vehicle is larger than a downshift determination threshold whose magnitude is determined in accordance with the magnitude of the vehicle speed deviation (Vs−Vset), the cruise downshift condition is satisfied, and downshift is performed. In the case where the magnitude of the actual acceleration Gs of the own vehicle is equal to or smaller than the downshift determination threshold, the cruise downshift condition is not satisfied, and no downshift is performed.

The downshift determination threshold is set such that its value decreases as the vehicle speed deviation (Vs−Vset) increases. As a result, the larger the magnitude of the vehicle speed deviation (Vs−Vset), the greater the likelihood of occurrence of downshift; i.e., the smaller the vehicle speed deviation (Vs−Vset), the smaller the likelihood of occurrence of downshift. Notably, in the case where the cruise downshift condition is not satisfied, the downshift by the gear shift control for cruise is not performed.

In the case where the travel mode of the own vehicle is a constant-speed-travel control mode, when the stop request signal is sent to the DSECU as a result of the cruise switch 14 being operated by the driver, the DSECU ends the constant-speed-travel control and changes the travel mode of the own vehicle to the normal travel mode.

Notably, when the travel mode is the normal travel mode, the engine ECU 20 determines a target throttle valve opening on the basis of the vehicle speed Vs and the accelerator pedal operation amount detected by the accelerator pedal operation amount sensor, and drives the throttle valve actuator such that the actual throttle valve opening coincides with the target throttle valve opening. Further, when the travel mode is the normal travel mode, the brake ECU 30 controls the brake actuator 33 on the basis of the brake pedal operation amount detected by the brake pedal operation amount sensor. Accordingly, the own vehicle travels with the desired acceleration Gs in accordance with a driver's driving operation.

<<Outline of Operation>>

In the case where the travel mode of the own vehicle is the constant-speed-travel control mode, the DSECU computes the required drive force Freq and the brake required braking force Bfreq as described below such that the actual acceleration Gs becomes equal to the target acceleration Ac*. Notably, the brake required braking force Bfreq is "0" or has a negative value. The larger the absolute value (magnitude) |Bfreq| of the brake required braking force Bfreq, the larger the friction braking force generated by the friction brake apparatuses 32.

The DSECU transmits a signal representing the required drive force Freq to the engine ECU 20. The engine ECU 20 computes a torque (power) to be generated by the internal combustion engine 22, on the basis of the gear stage (actual gear stage) Sgear and the required drive force Freq at the time of reception of the signal representing the required drive force Freq. This torque will be referred to as "engine required torque Tqreq." The engine ECU 20 controls the engine actuators 23 such that the internal combustion engine 22 generates a torque (power) equal to the engine required torque Tqreq.

The DSECU transmits a signal representing the brake required braking force Bfreq to the brake ECU 30. The brake ECU 30 controls the brake actuator 33 such that the total sum of the friction braking forces generated by the wheels becomes equal to the absolute value |Bfreq| of the brake required braking force Bfreq.

In the case where the actual acceleration Gs is equal to or larger than the target acceleration Ac* (for example, in the case where the vehicle is travelling on a downhill road), the DSECU first decreases the actual acceleration Gs by gradually decreasing the required drive force Freq. As a result of the required drive force Freq being decreased, the engine required torque Tqreq is decreased to "0," so that the drive source braking force becomes the maximum. If the actual acceleration Gs is equal to or greater than the target acceleration Ac* at that point in time, the DSECU decreases the brake required braking force Bfreq without performing downshift. Namely, the DSECU increases the absolute value (magnitude) Bfreq of the brake required braking force Bfreq.

As a result, the friction braking force increases, and when the actual acceleration Gs becomes equal to the target acceleration Ac*, the DSECU maintains the brake required braking force Bfreq at the value at that point in time. When the own vehicle having been traveling on the downhill road enters a flat road, since the actual acceleration Gs becomes smaller than the target acceleration Ac*, the DSECU decreases the absolute value (magnitude) |Bfreq| of the brake required braking force Bfreq.

However, in the case where the own vehicle is travelling on a long downhill road, there may arise a situation in which a state in which the absolute value Bfreq of the brake required braking force Bfreq is large (in other words, a friction brake high load state in which the friction braking force is larger than a predetermined threshold Bth) continues for a long period of time. At that time, the temperatures of the members of the friction brake apparatuses 32 increase and fade may occur. Notably, in such a situation, since the magnitude of the vehicle speed deviation (Vs−Vset) is less apt to increase and the actual acceleration Gs of the own vehicle is less apt to increase, the above-described cruise downshift condition is less likely to be satisfied. Therefore, the possibility of performance of downshift by the gear shift control for cruise is low.

In view of the above, when a downshift condition which will be described below is satisfied, the DSECU downshifts the gear stage of the automatic transmission 24 from the current gear stage Sgear by one stage (one speed) only. (Downshift Condition)

The downshift condition is a condition which is satisfied when the state in which the absolute value Bfreq of the brake required braking force Bfreq is larger than the predetermined threshold Bth (i.e., the friction brake high load state) has continued for a determination threshold time tsth or more.

When downshift is performed upon satisfaction of the downshift condition, the magnitude of the "drive source braking force (coasting deceleration which is deceleration caused by the drive source braking force)" acting on the own vehicle increases. Therefore, even when the friction braking force is decreased, it is possible to continuously render the actual acceleration Gs coincident with the target acceleration Ac*. Namely, the DSECU can decrease the absolute value |Bfreq| of the brake required braking force Bfreq. Since continuation of the friction brake high load state can be avoided by the downshift, occurrence of fade can be avoided. Notably, in the case where the own vehicle travels on a short downhill road, the downshift condition is unlikely to be satisfied. Therefore, the frequency of downshift decreases, whereby, the frequency at which deterioration in the drivability of the own vehicle occurs can be reduced.

<<Specific Operation>>

Figure 2:
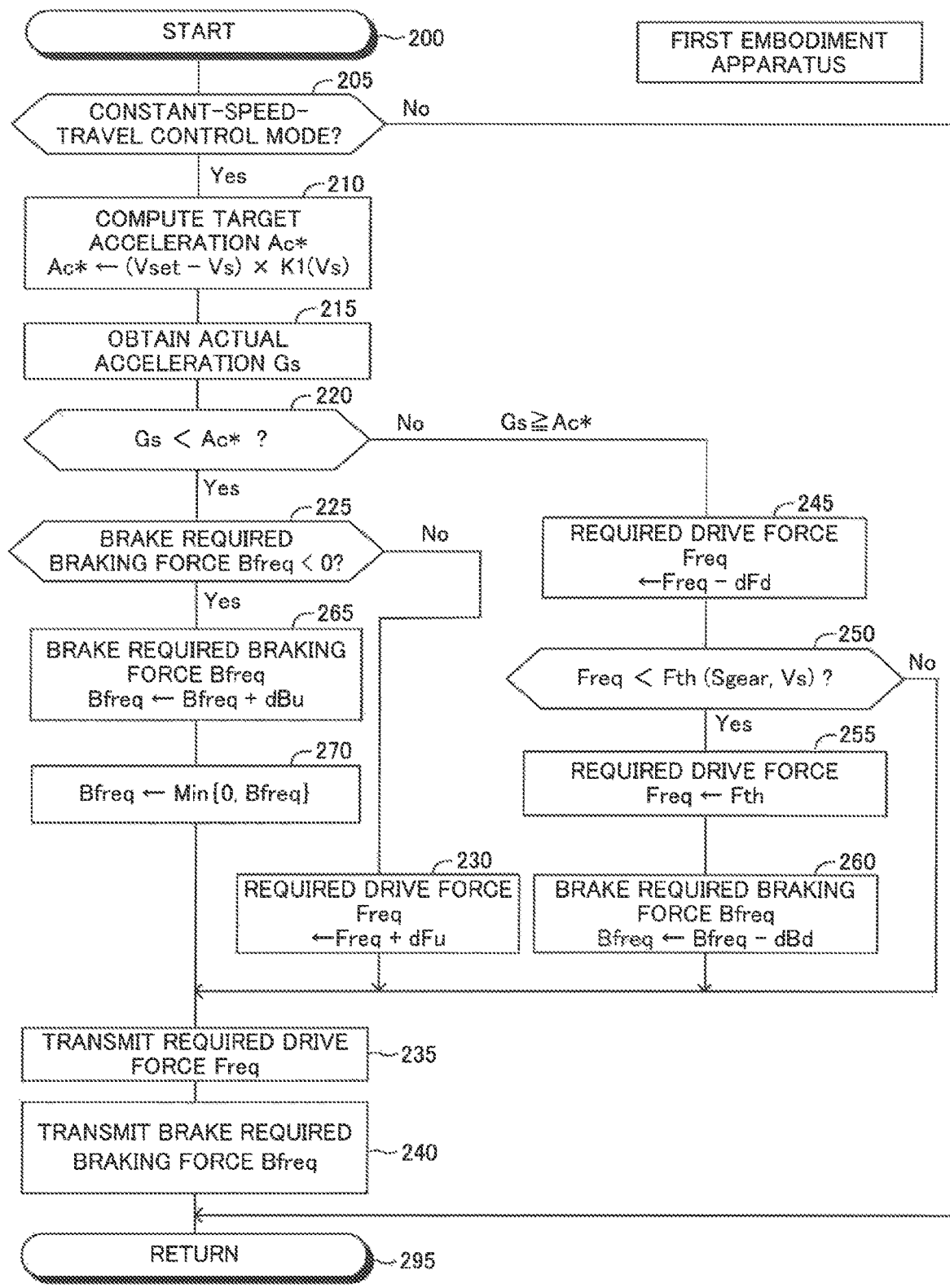
FIG. 2 is a flowchart representing a routine executed by a CPU of a driving support ECU of the vehicle control apparatus according to the first embodiment.
Figure 3:
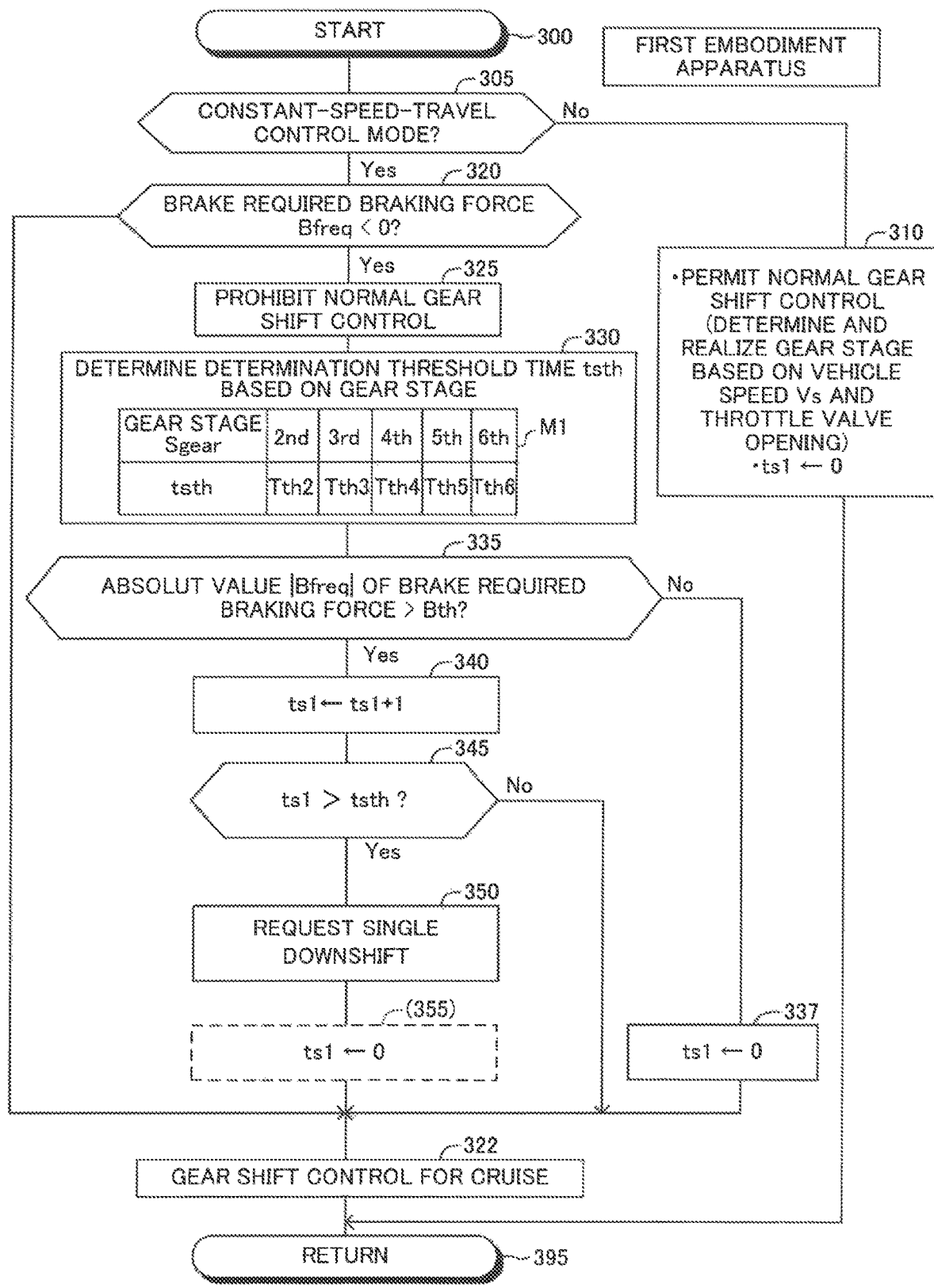
FIG. 3 is a flowchart representing another routine executed by the CPU of the driving support ECU of the vehicle control apparatus according to the first embodiment.

The CPU of the DSECU (hereafter simply referred to as the "CPU") executes routines shown by flowcharts in FIGS. 2 and 3 every time a predetermined time elapses.

Accordingly, when a predetermined timing has come, the CPU starts the routine of FIG. 2 from step 200 and proceeds to step 205 so as to determine whether or not the travel mode of the own vehicle is the constant-speed-travel control mode. The travel mode of the own vehicle is set to the normal travel mode by an initialization routine which is executed by the CPU when an unillustrated ignition key switch is turned from off to on. In the case where the travel mode is the normal travel mode, the CPU makes a "No" determination in step 205 and proceeds directly to step 295 so as to end the current execution of the present routine.

When the travel mode is changed to the constant-speed-travel control mode as a result of operation of the cruise switch 14, the CPU makes a "Yes" determination in step 205, successively performs the processing of step 210 and the processing of step 215, which will be described later, and proceeds to step 220.

Step 210: the CPU obtains the vehicle speed Vs of the own vehicle and computes the target acceleration Ac* by applying the vehicle speed Vs to the above-described Expression (1).

Step 215: the CPU obtains the actual acceleration Gs on the basis of the signal from the acceleration sensor 13.

The CPU determines in step 220 whether or not the actual acceleration Gs is smaller than the target acceleration Ac*. In the case where the actual acceleration Gs is smaller than the target acceleration Ac* (in the case where the own vehicle must be accelerated), the CPU makes a "Yes" determination in step 220 and proceeds to step 225 so as to determine whether or not the brake required braking force Bfreq which is reduced in step 260, which will be described later, is negative. Namely, the CPU determines whether or not friction braking force is generated at the present point in time. Notably, the brake required braking force Bfreq is set to "0" in the above-described initialization routine.

Here, the brake required braking force Bfreq is assumed to be equal to or larger than "0." In this case, the CPU makes a "No" determination in step 225, successively performs the processings of step 230 to step 240, which will be described below, and proceeds to step 295 so as to end the current execution of the present routine.

Step 230: the CPU increases the required drive force Freq by a predetermined amount dFu.

Step 235: the CPU transmits a signal representing the required drive force Freq to the engine ECU 20.

Step 240: the CPU transmits a signal representing the brake required braking force Bfreq to the brake ECU 30. Notably, in the case where the brake required braking force Bfreq is "0," the brake ECU 30 does not cause the brake actuator 33 to generate friction braking force.

Such processing is repeatedly performed when the actual acceleration Gs is smaller than the target acceleration Ac* and the brake required braking force Bfreq is equal to or larger than "0." As a result, the required drive force Freq increases gradually.

In contrast, in the case where the actual acceleration Gs is equal to or larger than the target acceleration Ac* at the point when the CPU performs the processing of step 228 (namely, the own vehicle must be decelerated), the CPU makes a "No" determination in step 220 and proceeds to step 245. In step 245, the CPU decreases the required drive force Freq by a predetermined amount dFd.

Next, the CPU proceeds to step 250 and determines whether or not the required drive force Freq computed in step 245 is smaller than a threshold drive force Fth. The threshold drive force Fth is a value which is determined by the gear stage Sgear and the vehicle speed Vs at the present point in time. The threshold drive force Fth is a value corresponding to the drive source braking force acting on the own vehicle when the torque generated by the internal combustion engine 22 is set to "0" (a value corresponding to coasting deceleration). In other words, in the case where the required drive force Freq is smaller than the threshold drive force Fth, the drive force of the own vehicle can not be decreased unless the gear stage is downshifted. Namely, in the case where the required drive force Freq is smaller than the threshold drive force Fth, unless the CPU downshifts the gear stage, the CPU cannot increase the drive source braking force, and, therefore, the CPU cannot increase the coasting deceleration.

Notably, in step 250, the CPU may compute the torque to be generated by the internal combustion engine 22 (the engine required torque Tqreq) on the basis of the gear stage Sgear and the required drive force Freq at the present point in time and determine whether or not the engine required torque Tqreq is equal to or smaller than "0."

In the case where the required drive force Freq is equal to or larger than the threshold drive force Fth, the CPU makes a "No" determination in step 250 and ends the current execution of the present routine after performing the processings of "step 235 and step 240" described above.

When this state continues, the required drive force Freq is decreased gradually by the processing of step 245 and becomes smaller than the threshold drive force Fth. In this case (namely, the case where the required drive force Freq is smaller than the threshold drive force Fth), the CPU makes a "Yes" determination in step 250 and successively performs the processings of step 255 and step 260, which will be described below. Subsequently, the CPU performs the processings of "step 235 and step 240" described above and ends the current execution of the present routine.

Step 255: the CPU sets the required drive force Freq to a value equal to the threshold drive force Fth.

Step 260: the CPU decreases the brake required braking force Bfreq by a predetermined amount dBd.

As described above, when the drive source braking force reaches the "maximum value of the drive source braking force which can be generated at the gear stage Sgear and the vehicle speed Vs at the present point in time," the absolute value of the brake required braking force Bfreq increases, so that the friction braking force increases. At that time, downshift by the gear shift control for cruise is not performed unless the above-described cruise downshift condition is satisfied.

Accordingly, in the case where the actual acceleration Gs is equal to or larger than the target acceleration Ac* after that, the required drive force Freq is maintained at the threshold drive force Fth in step 255, and the absolute value of the brake required braking force Bfreq is continuously increased in step 260. Therefore, the actual acceleration Gs becomes smaller than the target acceleration Ac*. In this case, the CPU makes a "Yes" determination in step 220 and proceeds to step 225. At that time, the brake required braking force Bfreq is smaller than "0." Therefore, the CPU makes a "Yes" determination in step 225 and successively performs the processings of step 265 and step 270, which will be described below. Subsequently, the CPU performs the processings of "step 235 and step 240" described above and ends the current execution of the present routine.

Step 265: the CPU increases the brake required braking force Bfreq by a predetermined amount dBu.

Step 270: the CPU sets the brake required braking force Bfreq to the smaller one of "0" and the brake required braking force Bfreq increased in step 265. Namely, the CPU limits (guards) the brake required braking force Bfreq such that the brake required braking force Bfreq has a value equal to or smaller than "0."

After that point in time, the processings of step 265 and step 270 are repeated when the actual acceleration Gs is smaller than the target acceleration Ac* and the brake required braking force Bfreq is smaller than "0." Accordingly, the brake required braking force Bfreq increases gradually (the absolute value of the brake required braking force Bfreq decreases gradually) with the required drive force Freq unchanged. When the actual acceleration Gs is smaller than the target acceleration Ac* after the point in time when the brake required braking force Bfreq is set to "0" in step 270, the required drive force Freq is increased gradually by the processing of step 230.

In contrast, when the actual acceleration Gs becomes equal to or larger than the target acceleration Ac* as a result of the brake required braking force Bfreq being increased gradually (as a result of the absolute value of the brake required braking force Bfreq being decreased gradually), the CPU makes a "No" determination in step 220 and proceeds to step 245 to step 260. Accordingly, in the case where the own vehicle travels, for a long period of time, on a "downhill road which requires friction braking force for performing constant-speed travel," the brake required braking force Bfreq remains in the vicinity of a certain value.

Meanwhile, when a predetermined timing has come, the CPU starts the routine of FIG. 3 from step 300 and proceeds to step 305 so as to determine whether or not the travel mode of the own vehicle is the constant-speed-travel control mode.

In the case where the travel mode is the normal travel mode, the CPU makes a "No" determination in step 305 and proceeds to step 310. In step 310, the CPU transmits to the engine ECU 20 a signal for permitting the above-described normal gear shift control and sets the value of a timer ts1 (which will be described later) to "0" (clears the timer ts1). The CPU then proceeds to step 395 and ends the current execution of the present routine. Notably, the value of the timer ts1 is set to "0" by the above-described initialization routine.

In contrast, in the case where the travel mode is the constant-speed-travel control mode, the CPU makes a "Yes"

determination in step 305 and proceeds to step 320 so as to determine whether or not either of Condition 1 and Condition 2 which will be described below is met.

Condition 1: the actual acceleration Ga is larger than the target acceleration Ac* (namely, the vehicle speed Vs must be decreased).

Condition 2: the brake required braking force Bfreq is smaller than 0 (Bfref<0).

In the case where none of Condition 1 and Condition 2 are met, the CPU makes a No determination in step 320, proceeds to step 322 so as to perform the above-described gear shift control for cruise, and ends the current execution of the present routine.

In the case where at least one of Condition 1 and Condition 2 is met at the point in time when the CPU performs the processing of step 320, the CPU makes a "Yes" determination in step 320, successively performs the processings of step 325 and step 330, which will be described below, and proceeds to step 335.

Step 325: the CPU transmits to the engine ECU 20 a signal for prohibiting the above-described normal gear shift control.

Step 330: the CPU determines (sets) the determination threshold time tsth on the basis of the gear stage Sgear at the present point in time. More specifically, the CPU obtains the determination threshold time tsth by applying the gear stage Sgear at the present point in time to a lookup table M1(Sgear).

According to the lookup table M1(Sgear), the determination threshold time tsth is determined as follows.

In the case where the gear stage Sgear at the present point in time is the 2nd gear (2nd), the determination threshold time tsth is set to a 2nd-gear corresponding time Tth2.

In the case where the gear stage Sgear at the present point in time is the 3rd gear (3rd), the determination threshold time tsth is set to a 3rd-gear corresponding time Tth3.

In the case where the gear stage Sgear at the present point in time is the 4th gear (4th), the determination threshold time tsth is set to a 4th-gear corresponding time Tth4.

In the case where the gear stage Sgear at the present point in time is the 5th gear (5th), the determination threshold time tsth is set to a 5th-gear corresponding time Tth5.

In the case where the gear stage Sgear at the present point in time is the 6th gear (6th), the determination threshold time tsth is set to a 6th-gear corresponding time Tth6.

These corresponding times satisfy the following relational expression (R1). The reason for this will be described later.

$$Tth6 < Tth5 \le Tth4 < Tth3 < Tth2 \qquad (R1)$$

Next, the CPU proceeds to step 335 so as to determine whether or not the absolute value (magnitude |Bfreq|) of the brake required braking force Bfreq is larger than a threshold 6th set to a predetermined positive value (hereinafter simply referred to as the "threshold 8th"). Namely, the CPU determines in step 335 whether or not the above-described friction brake high bad state has occurred.

In the case where the absolute value |Bfreq| of the brake required braking force Bfreq is equal to or smaller than the threshold 6th, the CPU makes a "No" determination in step 335 and proceeds to step 337 so as to set the value of the timer ts1 to "0" (dears the timer ts1). The CPU then proceeds to step 322 so as to perform the above-described gear shift control for cruise. After that, the CPU proceeds to step 395 and ends the current execution of the present routine.

In contrast, in the case where the absolute value Bfreq of the brake required braking force Bfreq is larger than the threshold 6th, the CPU makes a "Yes" determination in step 335 and proceeds to step 340 so as to increase the value of the timer ts1 by 1. The value of the timer ts1 represents the time over which the state in which the absolute value Bfreq of the brake required braking force Bfreq is larger than the threshold Bth (namely, the above-described friction brake high load state) continues.

Next, the CPU proceeds to step 345 so as to determine whether or not the value of the timer ts1 is larger than the determination threshold time tsth determined in step 330. In the case where the value of the timer ts1 is equal to or smaller than the determination threshold time tsth, the CPU makes a "No" determination in step 345, proceeds to step 322, and performs the above-described gear shift control for cruise. After that, the CPU proceeds to step 395 and ends the current execution of the present routine.

In contrast, in the case where the value of the timer ts1 is larger than the determination threshold time tsth, the above-described friction brake high load state has continued for a long period of time, and therefore, the temperature of each brake disc 32a and the temperature of each brake pad are likely to be excessively high. Namely, the state in which the value of the timer ts1 is larger than the determination threshold time tsth is a state in which the above-described downshift condition has been satisfied and a state in which the possibility of occurrence of fade is high.

In view of the above, in the case where the value of the timer ts1 is larger than the determination threshold time tsth, the CPU makes a "Yes" determination in step 345 and proceeds to step 350 so as to transmit to the engine ECU 20 a request for downshift of the gear stage of the automatic transmission 24 from the current gear stage Sgear by one stage (namely, a downshift request). Upon reception of the downshift request, the engine ECU 20 changes the gear stage of the automatic transmission 24 from the current gear stage Sgear to a lower gear stage adjacent to the current gear stage Sgear (performs downshift). After that, the CPU proceeds to step 322 so as to perform the above-described gear shift control for cruise and then proceeds to step 395 so as to end the current execution of the present routine.

As a result, the drive source braking force increases, whereby the deceleration of the own vehicle increases. Thus, the actual acceleration Gs becomes smaller than the target acceleration Ac*. Therefore, the processing of step 265 of FIG. 2 is performed, so that the absolute value of the brake required braking force Bfreq decreases. Accordingly, the temperature of each brake disc 32a and the temperature of each brake pad are prevented from increasing.

Now, operation of the DSECU when the own vehicle SV travels on a downhill road will be described by using an example shown in FIG. 4. In this example, the own vehicle SV travels, under the constant-speed-travel control, in a road section (section between point p0 and point p1) including a downhill road. The own vehicle SV travels on the downhill road from time t1 to time t8. The gear stage at time t1 is the 6th gear.

In the period between time t1 to time t2, since the own vehicle SV travels on the downhill road, the vehicle speed Vs increases gradually from the target vehicle speed Vset in spite of the fact that the constant-speed-travel control is performed. Namely, a speed increase amount (vehicle speed deviation) (Vs−Vset), which is the difference between the target vehicle speed Vset and the vehicle speed Vs, increases gradually. Accordingly, the actual acceleration Gs becomes equal to or larger than the target acceleration Ac*, and therefore, the DSECU decreases the required drive force Freq after time t1 (see step 245).

At time t2, the magnitude of the required drive force Freq becomes smaller than the threshold drive force Fth. Namely, the drive source braking force in the case where the gear stage is the 6th gear reaches the maximum value. Therefore, after time t2, the DSECU gradually decreases the brake required braking force Bfreq from "0" (see step 260). Namely, the DSECU increases the magnitude (absolute value) of the brake required braking force Bfreq. As a result, the magnitude of the brake required braking force Bfreq becomes larger than the threshold Bth at time t3. Namely, the above-described friction brake high bad state occurs at time t3.

Since the magnitude (absolute value) of the brake required braking force Bfreq increases after time t2, the friction braking force generated by each friction brake apparatus 32 increases. Therefore, the vehicle speed Vs approaches the target vehicle speed Vset, and the temperature of each brake disc 32*a* and the temperature of each brake pad increase gradually.

Figure 5:
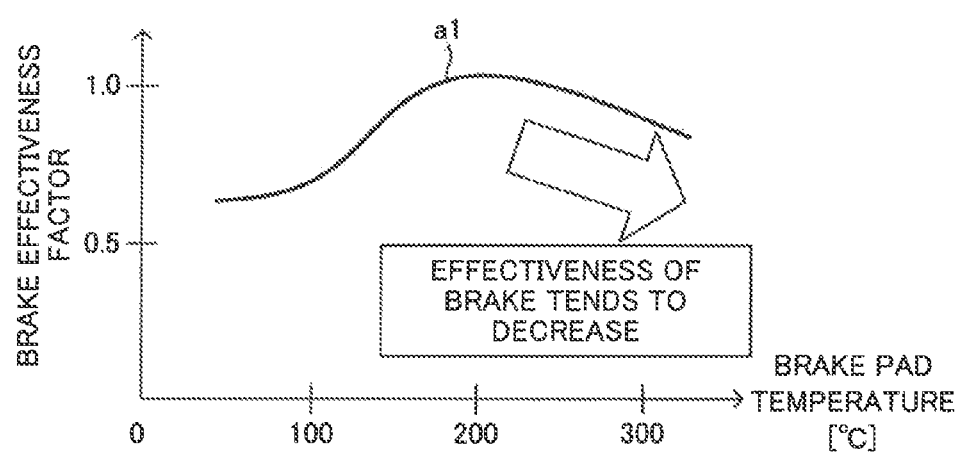
FIG. 5 is a graph showing the relation between brake pad temperature and brake effectiveness factor.

It has been known that, as indicated by a line al of FIG. 5, the brake performance (brake effectiveness factor) of a friction brake mechanism lowers when the temperatures of the brake pads of the friction brake mechanism increase and exceed a certain temperature (for example, about 200° C.). The brake performance means the friction braking force generated when the brake pads are pressed against the brake disc 32*a* with a certain form Namely, fade occurs when the temperature of each brake pad becomes equal to or higher than a certain temperature.

In the case where the fade has deteriorated the brake performance, a sufficient deceleration cannot be generated by using friction braking force during the constant-speed-travel control. Therefore, the driver may feel an unnatural sensation. Also, in the case where the driver performs a braking operation after the travel mode of the own vehicle SV is changed to the normal travel mode, the driver may feel that the brake performance is poor.

In view of the above, when the period of time ts over which the friction brake high bad state continues (period of time ts starting from time t3) becomes longer than the determination threshold time tsth (in this case, the 6th-gear corresponding time Tth6), the DSECU performs downshift for ending the friction brake high bad state (for reducing the burden of each friction brake apparatus 32).

More specifically, at time t4, when the period of time ts becomes equal to the 6th-gear corresponding time Tth6, the DSECU downshifts the gear stage of the automatic transmission 24 from the 6th gear (current gear stage) to the 5th gear (see step 345 and step 350). Since the drive source braking force increases as a result of the downshift, the friction braking force to be generated by the friction brake apparatus 32 can be decreased (see step 265).

After the downshift, the DSECU changes the determination threshold time tsth from the 6th-gear corresponding time Tth6 to the 5th-gear corresponding time Tth5 corresponding to the 5-th which is the gear stage after the downshift.

Figure 4:
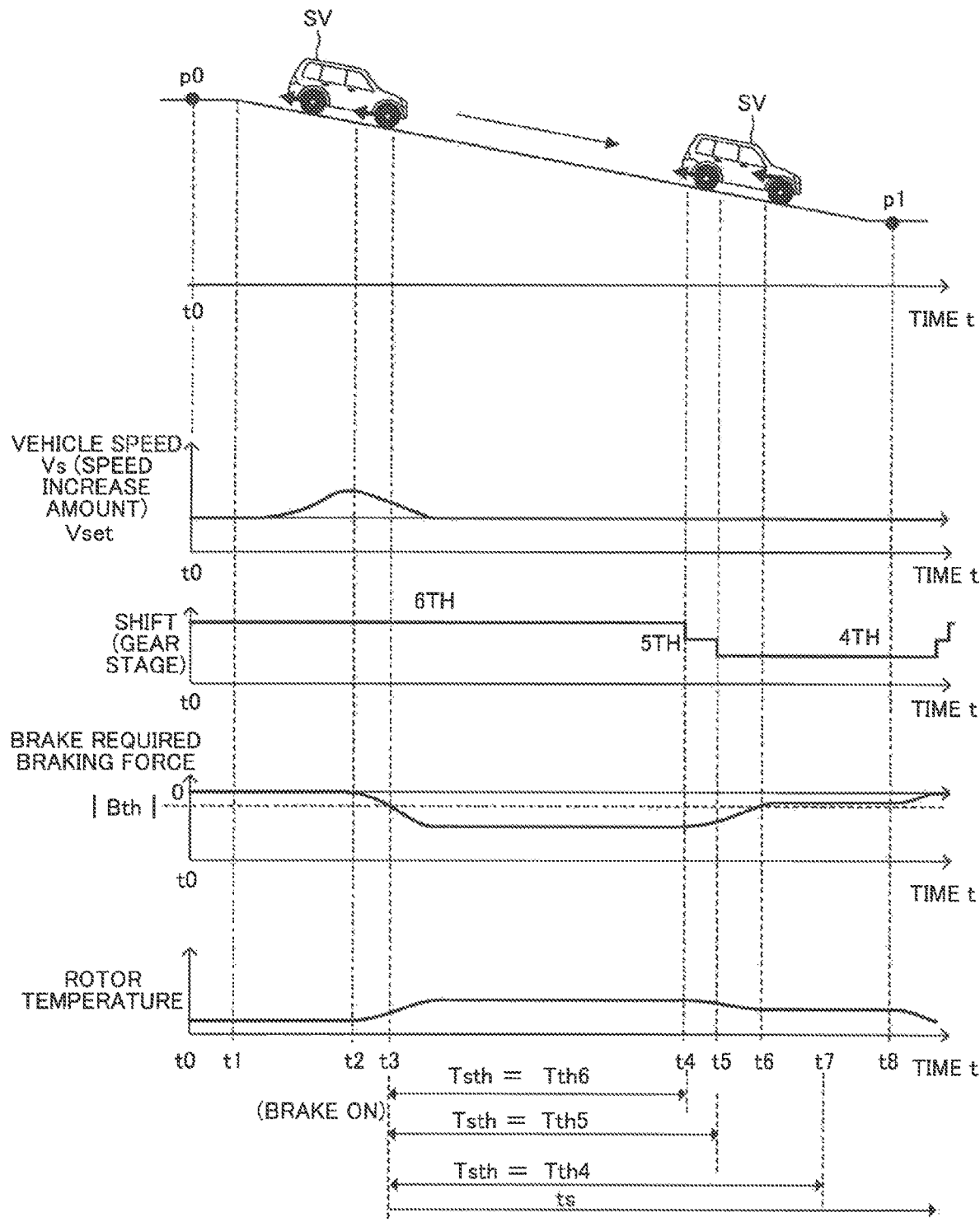
FIG. 4 is a time chart for describing operation of the vehicle control apparatus.

In the example shown in FIG. 4, the period of time ts over which the friction brake high bad state continues becomes equal to or longer than the 5th-gear corresponding time Tth5 at time t5. Therefore, at time t5, the DSECU downshifts the gear stage of the automatic transmission 24 from the 5th gear (current gear stage) to the 4th gear. As a result, the friction braking force to be generated by the friction brake apparatus 32 can be decreased more. As a result, the magnitude of the brake required braking force Bfreq becomes smaller than the threshold Bth at time t6, and the friction brake high load state ends at time t6. Thus, the temperature of each brake disc 32*a* and the temperature of each brake pad are prevented from increasing excessively, and occurrence of fade can be avoided.

Incidentally, the first embodiment apparatus sets the Nth-gear corresponding time TthN (N is an integer of 2 to 6) such that the above-described relational expression (R1) is satisfied (see step 330). Namely, an Mth-gear corresponding time TthM corresponding to an Mth gear stage which is relatively high in speed (small in gear ratio) is shorter than an Lth-gear corresponding time TthL corresponding to an Lth gear stage (M>L) which is relatively low in speed (large in gear ratio).

The reason why the determination threshold time tsth is set as described above is as follows. Namely, when the downshift is performed to a gear stage which is relatively large in gear ratio (for example, a low gear stage (any of the 1st gear to the 3rd gear)), the increase amount of the drive source braking force is large. Therefore, the possibility that the downshift greatly increases the coasting deceleration is high, Therefore, the coasting deceleration becomes excessive after the downshift, and the possibility that upshift is performed immediately becomes high.

As a result, the downshift and the upshift may be frequently repeated (namely, busy shift may occur), and drivability may deteriorate. Accordingly, it is preferred to the downshift to a low gear stage be performed carefully. Therefore, the DSECU sets the determination threshold time tsth such that the lower the gear stage (the larger the gear ratio), the longer the determination threshold time tsth. Namely, in the case where the gear stage is a low gear stage, the DSECU performs downshift when the friction brake high load state continues for a relatively long period of time.

Meanwhile, in the case where the own vehicle SV is travelling in a high gear stage (for example, one of the 4th gear to the 6th gear) which is relatively small in gear ratio, the drive source braking force is small. Therefore, the friction braking force required to be generated by each friction brake apparatus 32 becomes large. Since a larger burden is therefore imposed on each friction brake apparatus 32, it is preferred that the downshift be performed as early as possible.

Therefore, the DSECU sets the determination threshold time tsth such that the higher the gear stage (the smaller the gear ratio), the shorter the determination threshold time tsth. Namely, in the case where the gear stage is a high gear stage, the DSECU performs downshift when the friction brake high load state continues for a relatively short period of time. As a result, the state in which a large burden is imposed on each friction brake apparatus 32 can be ended early, and occurrence of fade can be avoided. Moreover, even when the downshift to a high gear stage is performed, the coasting deceleration does not increase greatly. Therefore, the possibility of occurrence of busy shift is very low.

Notably, in the example shown in FIG. 4, the friction brake high load state ends at time t6, which precedes time t7 at which the period of time from time t3 (at which the friction brake high load state has started to occur) becomes equal to the 4th-gear corresponding time Tth4. Accordingly, the downshift is not performed again at time t7.

As having been described above, the first embodiment apparatus can reduce the possibility that the friction brake high bad state continues for a long period of time, while decreasing the frequency of downshift, for example, in the case where the own vehicle SV travels on a downhill road under the constant-speed-travel control. As a result, the possibility of occurrence of fade (phenomenon in which brake performance deteriorates) can be reduced.

First Modification of First Embodiment Apparatus

A first modification of the first embodiment apparatus differs from the first embodiment apparatus only in the point that the value of the timer ts1 is set to "0" (the timer ts1 is cleared) every time downshift is performed by the processing of step 355 of FIG. 3. More specifically, the CPU of the apparatus according to this modification proceeds to step 355 after having performed the processing of step 350 of FIG. 3 and sets the value of the timer ts1 to "0." Accordingly, when the downshift is performed, the next downshift is performed when the friction brake high load state continues for the determination threshold time tsth corresponding to the gear stage to which the downshift has been performed.

This apparatus can also reduce the possibility of occurrence of "fade and drivability deterioration due to busy shift" like the first embodiment apparatus.

Second Modification of First Embodiment Apparatus

A second modification of the first embodiment apparatus differs from the first modification of the first embodiment apparatus only in the point that the determination threshold time tsth is not changed in accordance with the gear stage Sgear of the automatic transmission 24 at the present point in time, and the determination threshold time tsth is set to a fixed value Tth (fixed time Tth).

More specifically, the CPU of the apparatus according to this modification performs the routine shown by a flowchart in FIG. 6 instead of the routine shown in FIG. 3. The routine of FIG. 6 is a routine obtained by replacing step 330 of FIG. 3 with step 330a and configured to perform the processing of step 355.

Accordingly, when the CPU proceeds to step 330a, the CPU sets the determination threshold time tsth to the fixed time Tth. Further, the CPU sets the value of the timer ts1 to "0" (clears the timer ts1) in step 355 every time downshift is performed by the processing of step 350.

This apparatus also performs downshift when the friction brake high load state continues for the fixed time Tth during execution of the constant-speed-travel control. Accordingly, the possibility that the friction brake high load state continues for a long period of time can be reduced.

Second Embodiment

Next, a vehicle control apparatus according to a second embodiment of the present invention (hereinafter may be referred to as the "second embodiment apparatus") will be described.

The second embodiment apparatus differs from the first embodiment apparatus only in the following point.

Figure 7:
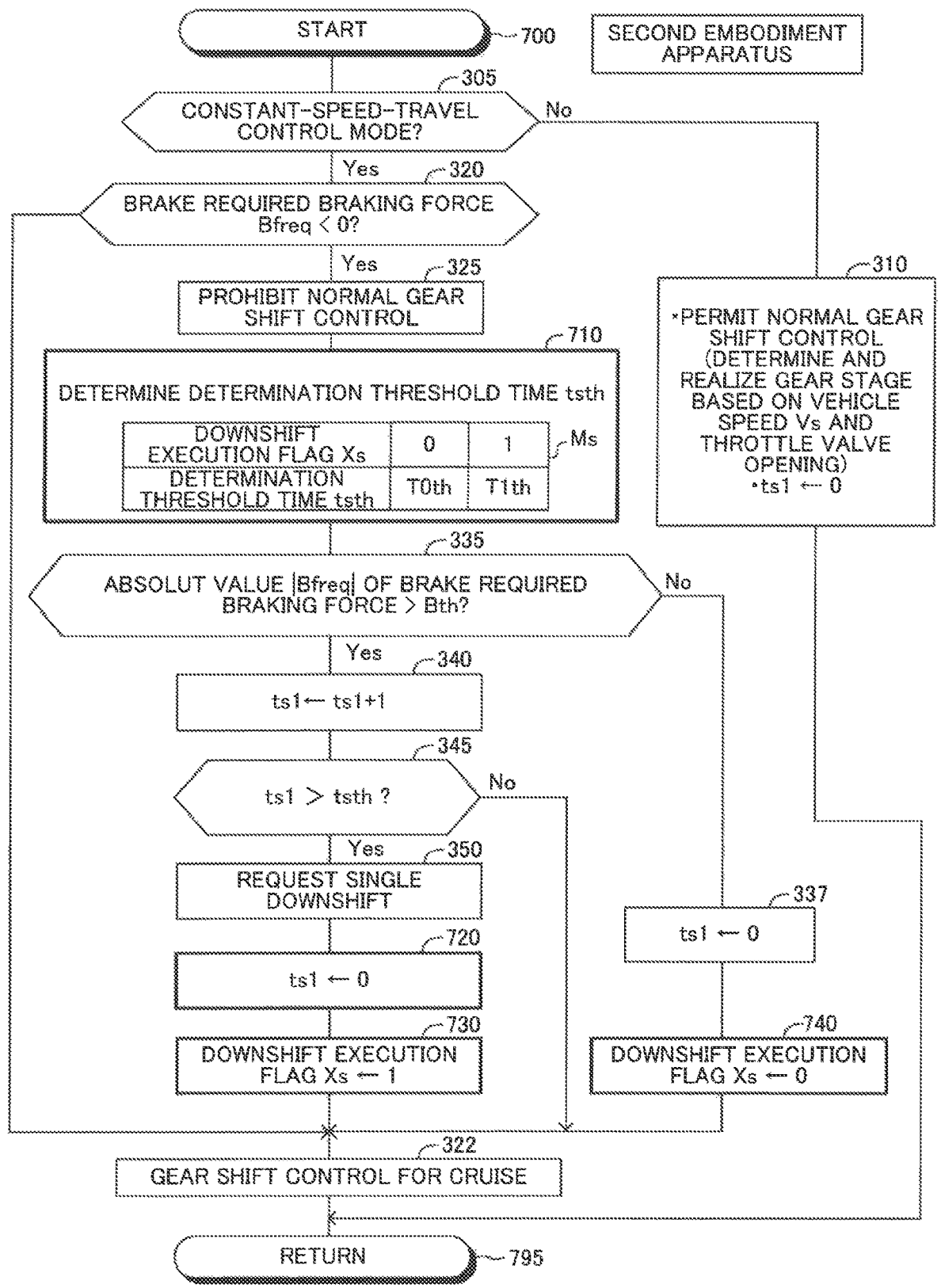
FIG. 7 is a flowchart representing a routine executed by a CPU of a driving support ECU of a vehicle control apparatus according to a second embodiment.

The second embodiment apparatus performs the routine shown in FIG. 7 instead of the routine shown in FIG. 3.

The second embodiment apparatus which performs the routine shown in FIG. 7 does not set the determination threshold time tsth to one of different times in accordance with the gear stage Sgear at the present point in time (step 330), Instead, the second embodiment apparatus changes the determination threshold time tsth in accordance with whether or not the own vehicle has performed downshift (has experienced downshift) in a period during which the friction brake high load state (a state in which the absolute value |Bfreq| of the brake required braking force Bfreq is larger than the threshold Bth) continues.

Specifically, in the case where the own vehicle has not experienced downshift (downshift has never been performed) in the period during which the friction brake high load state has continued, the second embodiment apparatus sets the determination threshold time tsth to be longer as compared with the case where the own vehicle has experienced downshift (downshift has been performed at least one time).

Thus, the determination threshold time tsth is set to a relatively long time until the first downshift is performed in the period during which the friction brake high load state has continued. Therefore, when the downhill road is relatively short, downshift becomes less likely to be performed. Accordingly, the frequency at which deterioration in drivability occurs can be reduced.

Meanwhile, the friction brake high load state continues after the first downshift has been performed in the period during which the friction brake high load state has continued, the determination threshold time tsth is set to a relatively short time. Accordingly, in the case where the friction brake high load state continues even after the first downshift, for example, because the downhill road is long, second and subsequent downshifts are performed quickly. As a result, it is possible to reduce the possibility that the temperatures of the members of each friction brake apparatus 32 increase and fade occurs.

Now, the second embodiment apparatus will be described with focusing on this difference.

The routine shown in FIG. 7 differs from the routine of FIG. 3 in the following points only.

Step 330 of the routine shown in FIG. 3 is replaced with step 710.

Step 720 and step 730 are added between step 350 and step 322.

Step 740 is added between step 337 and step 322.

Accordingly, in the below, these different steps will be mainly described.

When the CPU proceeds to step 710, the CPU determines (sets) the determination threshold time tsth on the basis of a downshift execution flag Xs, Specifically, the CPU obtains the determination threshold time tsth by applying the value of the downshift execution flag Xs at the present point in time to a lookup table Ms.

Notably, in the case where the value of the downshift execution flag Xs is "1," it represents that downshift has been performed at least one time (one or more times) in a period during which the friction brake high load state (the state in which the absolute value Bfreq of the brake required braking force Bfreq is larger than the threshold 8th) continues. In the case where the value of the downshift execution flag Xs is "0," it represents that downshift has never been performed in the period during which the friction brake high load state (the state in which the absolute value |Bfreq| of the brake required braking force Bfreq is larger than the threshold 8th) continues. Notably, the value of the downshift execution flag Xs is set to "0" by the above-described initialization routine.

According to the lookup table Ms, the determination threshold time tsth is determined as follows.

In the case where the value of the downshift execution flag Xs at the present point in time is "0" (namely, in the case where the vehicle has experienced no downshift), the determination threshold time tsth is set to an "SD-absence corresponding time T1th."

In the case where the value of the downshift execution flag Xs at the present point in time is "1" (namely, in the case where the vehicle has experienced downshift), the determination threshold time tsth is set to an "SD-presence corresponding time T1th."

Notably, these corresponding times satisfy the following relational expression (R2).

$$T0th > T1th \tag{R2}$$

The determination threshold time tsth determined in step 710 is used for the determination in step 345. In the case where the CPU proceeds to step 345 when the value of the downshift execution flag Xs is "0," the "SD-absence corresponding time T0th" which is a relatively long time is used as the determination threshold time tsth. As a result, the time between the occurrence of the friction brake high load state ("Yes" determination in step 335) and the first performance of downshift (step 350) becomes relatively long.

In the case where the value of the timer ts1 is larger than the determination threshold time tsth (=T0th), the CPU makes a "Yes" determination in step 345, successively performs the processings of step 350, step 720, and step 730 which will be described later, and proceeds to step 795 so as to end the current execution of the present routine.

Step 350: the CPU transmits to the engine ECU 20 a request for downshift of the gear stage of the automatic transmission 24 from the current gear stage Sgear by one stage (namely, a downshift request). Upon reception of the downshift request, the engine ECU 20 changes the gear stage of the automatic transmission 24 from the current gear stage Sgear to a lower gear stage adjacent to the current gear stage Sgear (performs downshift).

Step 720: the CPU sets the value of the timer ts1 to "0" (clears the timer ts1).

Step 730: the CPU sets the value of the downshift execution flag Xs to "1."

In the case where the CPU proceeds to step 710 after that when the value of the downshift execution flag Xs is "1," the "SD-presence corresponding time T1th" which is a relatively short time is used as the determination threshold time tsth. As a result, the time until the next downshift is performed in the period during which the friction brake high load state continues becomes short.

In the case where the value of the timer ts1 is larger than the determination threshold time tsth (=T1th), the CPU makes a "Yes" determination in step 345 and proceeds to step 350 so as to transmit the downshift request to the engine ECU 20. Upon reception of the downshift request, the engine ECU 20 performs downshift. As a result, in the case where the friction brake high load state continues even after the first downshift, second and subsequent downshifts are performed quickly.

After that, the CPU sets the value of the tinier ts1 to "0" (dears the timer ts1) in step 720 and sets the value of the downshift execution flag Xs to "1" in step 730, After performing the processing of step 322 in this state, the CPU proceeds to step 795 so as to end the current execution of the present routine.

Notably, in the case where the absolute value |Bfreq| of the brake required braking force Bfreq is equal to or smaller than the threshold Bth at the point when the CPU performs the processing of step 335, the CPU makes a "No" determination in step 335 and successively performs the processings of step 337 and step 740, which will be described below. Subsequently, the CPU performs the processing of step 322 and proceeds to step 795 so as to end the current execution of the present routine.

Step 337: the CPU sets the value of the timer ts1 to "0" (dears the timer ts1).

Step 740: the CPU sets the value of the downshift execution flag Xs to "0."

The above-described second embodiment apparatus can reduce the frequency of drivability deterioration and can reduce the possibility that the temperatures of the members of the friction brake apparatuses 32 increase and fade occurs.

First Modification of Second Embodiment

A first modification of the second embodiment apparatus differs from the second embodiment apparatus only in the point that the determination threshold time tsth is changed in accordance with the gear stage Sgear of the automatic transmission 24 at the present point in time.

More specifically, the CPU of the apparatus according to this modification performs the routine shown by a flowchart in FIG. 8 in place of the routine shown in FIG. 7. The routine of FIG. 8 is a routine obtained by replacing step 710 of FIG. 7 with step 710a.

Accordingly, when the CPU proceeds to step 710a, the CPU obtains the determination threshold time tsth by applying the value of the downshift execution flag Xs at the present point in time and the gear stage Sgear at the present point in time to lookup tables Ms0 and Ms1, respectively.

According to the lookup table Ms0, the determination threshold time tsth is determined as follows.

In the case where the value of the downshift execution flag Xs at the present point in time is "0" and the gear stage Sgear at the present point in time is the 2nd gear (2nd), the determination threshold time tsth is set to an SD-absence 2nd-gear corresponding time T0th2.

In the case where the value of the downshift execution flag Xs at the present point in time is "0" and the gear stage Sgear at the present point in time is the 3rd gear (3rd), the determination threshold time tsth is set to an SD-absence 3rd-gear corresponding time T0th3.

In the case where the value of the downshift execution flag Xs at the present point in time is "0" and the gear stage Sgear at the present point in time is the 4th gear (4th), the determination threshold time tsth is set to an SD-absence 4th-gear corresponding time T0th4.

In the case where the value of the downshift execution flag Xs at the present point in time is "0" and the gear stage Sgear at the present point in time is the 5th gear (5th), the determination threshold time tsth is set to an SD-absence 5th-gear corresponding time T0th5.

In the case where the value of the downshift execution flag Xs at the present point in time is "0" and the gear stage Sgear at the present point in time is the 6th gear (6th), the determination threshold time tsth is set to an SD-absence 6th-gear corresponding time T0th6.

These corresponding times satisfy the following relational expression (R3).

$$T0th6 < T0th5 < T0th4 < T0th2 < T0th2 \tag{R3}$$

According to the lookup table Ms1, the determination threshold time tsth is determined as follows.

In the case where the value of the downshift execution flag Xs at the present point in time is "1" and the gear stage Sgear at the present point in time is the 2nd gear (2nd), the determination threshold time tsth is set to an SD-presence 2nd-gear corresponding time T1th2.

In the case where the value of the downshift execution flag Xs at the present point in time is "1" and the gear stage Sgear at the present point in time is the 3rd gear (3rd), the determination threshold time tsth is set to an SD-presence 3rd-gear corresponding time T1th3.

In the case where the value of the downshift execution flag Xs at the present point in time is "1" and the gear stage Sgear at the present point in time is the 4th gear (4th), the determination threshold time tsth is set to an SD-presence 4th-gear corresponding time T1th4.

In the case where the value of the downshift execution flag Xs at the present point in time is "1" and the gear stage Sgear at the present point in time is the 5th gear (5th), the determination threshold time tsth is set to an SD-presence 5th-gear corresponding time T1th5.

In the case where the value of the downshift execution flag Xs at the present point in time is "1" and the gear stage Sgear at the present point in time is the 6th gear (6th), the determination threshold time tsth is set to an SD-presence 6th-gear corresponding time T1th6.

These corresponding times satisfy the following relational expression (R4).

$$T1th6 < T1th5 < T1th4 < T1th3 < T1th2 \qquad (R4)$$

Further, these corresponding times satisfy the following relational expressions (R5a) to (R5e).

$$T0th2 > T1th2 \qquad (R5a)$$

$$T0th3 > T1th3 \qquad (R5b)$$

$$T0th4 > T1th4 \qquad (R5c)$$

$$T0th5 > T1th5 \qquad (R5d)$$

$$T0th6 > T1th6 \qquad (R5e)$$

After that, the determination threshold time tsth determined in step 710a is used for the determination in step 345. As a result, in the case where downshift has never been performed and the value of the downshift execution flag Xs is "0," the time between the occurrence of the friction brake high bad state and the first performance of downshift (step 350) becomes relatively long (see the relational expressions (R5a) to (R5e)).

In the case where the value of the downshift execution flag Xs is "1," the time until the next downshift (step 350) is performed in the period during which the friction brake high load state continues ("Yes" determination in step 335) becomes relatively short (see the relational expressions (R5a) to (R5e)).

Accordingly, it is possible to reduce the frequency of drivability deterioration and to reduce the possibility that the temperatures of the members of each friction brake apparatus 32 increase and fade occurs.

In addition, the higher the gear stage Sgear of the automatic transmission 24 at the present point in time (the smaller the gear ratio), the shorter the time between occurrence of the friction brake high bad state ("Yes" determination in step 335) and the determination to perform downshift ("Yes" determination in step 345) (see the relational expressions (R3) and (R4)).

Accordingly, for example, in the case where the own vehicle travels on a downhill road under the constant-speed-travel control, it is possible to reduce the possibility that the friction brake high load state continues for a long period of time while reducing the frequency of downshift. As a result, the possibility of occurrence of fade can be reduced.

This apparatus can also reduce the frequency of drivability deterioration and reduce the possibility that the temperatures of the members of each friction brake apparatus 32 increase and fade occurs. Furthermore, this apparatus can reduce the possibility of occurrence of fade while reducing the frequency of downshift.

Second Modification of Second Embodiment

A second modification of the second embodiment apparatus differs from the first modification of the second embodiment apparatus only in the point that the processing of step 720 of FIG. 7 is not performed. Namely, in the first modification of the second embodiment apparatus, the value of the timer ts1 is set to "0" (the timer ts1 is cleared) by the processing of step 720 every time downshift is performed. In contrast, in the second modification of the second embodiment apparatus, the value of the timer ts1 is not set to "0" (the timer ts1 is not cleared) by the processing of step 720 every time downshift is performed This apparatus can also reduce the frequency of drivability deterioration and reduce the possibility that the temperatures of the members of each friction brake apparatus 32 increase and fade occurs. Furthermore, this apparatus can also reduce the possibility of occurrence of fade while reducing the frequency of downshift.

The embodiments of the present invention have been described; however, the present invention is not limited to the above-described embodiments, and various modifications based on the technical idea of the present invention can be employed.

The automatic transmission in the above-described embodiments is a multi-speed automatic transmission. However, the automatic transmission may be a CVT (continuously variable transmission). In this case, the term "downshift" may refer to pseudo downshift in which the gear ratio increases continuously (for example, pseudo downshift in which the gear ratio increases continuously from a predetermined gear ratio by a predetermined change amount).

The above-described embodiment apparatuses and the modifications thereof may include, as a drive source, a motor (power engine) only or a motor and an internal combustion engine. In the case where the drive source includes a motor, the drive source braking force may include regenerative braking force. In this case, during downshift, current supplied to the motor is stopped or reduced, whereby the regenerative braking force is generated or increased.

The above-described embodiment apparatuses and the modifications thereof may be configured to perform well known follow-up travel control (vehicle-to-vehicle distance control, adaptive cruise control (ACC)) as cruise control.

Follow-up vehicle-to-vehicle distance control is a control for causing the own vehicle to follow a vehicle travelling ahead of the own vehicle, while maintaining a predetermined distance between the own vehicle and the vehicle traveling ahead, on the basis of target information. The follow-up vehicle-to-vehicle distance control itself is known (for example, Japanese Patent Application Laid-Open (kokai) No, 2014-148293, Japanese Patent Application Laid-Open (kokai) No. 2006-315491, Japanese Patent No. 4172434, Japanese Patent No. 4929777, etc.).

The outline of the follow-up vehicle-to-vehicle distance control is, for example, as follows. Namely, during execution of the follow-up vehicle-to-vehicle distance control, a vehicle to follow within a predetermined vehicle-to-follow area on the basis of target information obtained by the radar sensor 11.

Further, the DSECU computes the target acceleration Gtgt in accordance with either one of the following Expressions (2) and (3). In Expressions (2) and (3), Vfx(a) is the relative speed of the vehicle to follow, k1 and k2 are predetermined positive gains (coefficients), ΔD1 is an inter-vehicle distance deviation (ΔD1=Dfx(a)−Dtgt) obtained by subtracting a "target inter-vehicle distance Dtgt from an inter-vehicle distance Dfx of the vehicle to follow." Notably, the target inter-vehicle distance Dtgt is computed from the product of the vehicle speed Vs of the own vehicle and a target inter-vehicle time Ttgt set by the driver using the cruise switch 14 (Dtgt=Ttgt×Vs).

When the value (k1×ΔD1+k2×Vfx(a)) is positive or "0," the DSECU determines the target acceleration Gtgt by using the following Expression (2). ka1 is a positive gain (coefficient) for acceleration and is set to a value equal to or smaller than "1."

$$Gtgt(\text{for acceleration})=Ka1\times(k1\times\Delta D1+k2\times Vfx(a)) \quad (2)$$

Meanwhile, when the value (k1×ΔD1+k2×Vfx(a)) is negative, the DSECU determines the target acceleration Gtgt by using the following Expression (3). kd1 is a gain (coefficient) for deceleration and is set to "1" in the present example.

$$Gtgt(\text{for deceleration})=kd1\times(k1\times\Delta D1+k2\times Vfx(a)) \quad (3)$$

Notably, in the case where no object is present in the vehicle-to-follow area, the DSECU determines the target acceleration Gtgt on the basis of a target speed SPDtgt and the vehicle speed Vs of the own vehicle such that the vehicle speed Vs coincides with the "target speed SPDtgt set in accordance with the target inter-vehicle time Ttgt."

The DSECU controls the engine actuators 23 by using the engine ECU 20 and controls the brake actuator 33 by using the brake ECU 30 when necessary such that the acceleration Gs of the vehicle coincides with the target acceleration Gtgt. The above is the outline of the follow-up vehicle-to-vehicle distance control.

The embodiment apparatuses and the modification apparatuses may use in step 335 a target brake oil pressure, the cumulative value of the brake required braking force, the cumulative value of the target brake oil pressure, or the like, instead of the brake required braking force.

What is claimed is:

1. A vehicle control apparatus for a vehicle including a power engine, an automatic transmission for transmitting power generated by the power engine to drive wheels of the vehicle, and a friction brake apparatus for generating friction braking force applied to the vehicle, the vehicle control apparatus performing constant-speed-travel control for causing the vehicle to travel such that vehicle speed which is the speed of the vehicle coincides with a predetermined target vehicle speed, the vehicle control apparatus comprising:
a power reducing section which controls the power engine so as to reduce the power, without causing the automatic transmission to change its gear ratio, in the case where the vehicle speed must be decreased to coincide with the target vehicle speed;
a friction braking force increasing section which controls the friction brake apparatus so as to increase the friction braking force, without causing the automatic transmission to change the gear ratio, in the case where the vehicle speed must be decreased to coincide with the target vehicle speed even after the power has been reduced by the power reducing section; and
a downshift performing section which causes the automatic transmission to perform downshift upon satisfaction of a downshift condition which is satisfied when a friction brake high load state which is a state in which the friction braking force is larger than a predetermined threshold continues for a predetermined determination threshold time, the downshift changing the gear ratio of the automatic transmission to a gear ratio larger than a gear ratio at a point in time when the downshift condition is satisfied.

2. The vehicle control apparatus according to claim 1, wherein the downshift performing section is configured to set the determination threshold time such that the smaller the gear ratio of the automatic transmission during a period during which the friction brake high load state continues, the shorter the determination threshold time.

3. The vehicle control apparatus according to claim 1, wherein the downshift performing section is configured to set the determination threshold time to a first time in the case where the downshift has never been performed in the period during which the friction brake high bad state continues, and set the determination threshold time to a second time shorter than the first time after the downshift has been performed.

* * * * *